(12) United States Patent
Harrison et al.

(10) Patent No.: US 7,518,118 B2
(45) Date of Patent: Apr. 14, 2009

(54) DEPTH SENSING IN CDZNTE PIXEL DETECTORS (75) Inventors: Fiona A. Harrison, Los Angeles, CA (US); Walter Cook, Long Beach, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 12/037,889

(22) Filed: Feb. 26, 2008

(65) Prior Publication Data
US 2008/0203313 A1 Aug. 28, 2008

Related U.S. Application Data (60) Provisional application No. 60/903,807, filed on Feb. 27, 2007.

(51) Int. Cl.
G01T 1/24 (2006.01)

(52) U.S. Cl. .................... 250/371; 250/370.1

(58) Field of Classification Search .............. 250/370.1, 250/371
See application file for complete search history.

(56) References Cited

U.S. PATENT DOCUMENTS

| 5,943,388 | A | 8/1999 | Tumer | |
| 6,169,287 | B1* | 1/2001 | Warburton | 250/370.1 |
| 6,420,711 | B2 | 7/2002 | Tumer | |
| 6,556,650 | B2 | 4/2003 | Francke | |
| 6,720,812 | B2 | 4/2004 | Tumer et al. | |
| 7,138,635 | B2 | 11/2006 | Heismann | |
| 2002/0079456 | A1* | 6/2002 | Lingren et al. | 250/370.01 |
| 2003/0158588 | A1 | 8/2003 | Rizzo | |
| 2004/0017224 | A1 | 1/2004 | Tumer et al. | |
| 2004/0239377 | A1 | 12/2004 | Tumer et al. | |
| 2005/0167606 | A1 | 8/2005 | Harrison et al. | |
| 2007/0007463 | A1* | 1/2007 | DeGeronimo | 250/382 |
| 2007/0040126 | A1* | 2/2007 | El-Hanany et al. | 250/370.09 |
| 2007/0235657 | A1* | 10/2007 | He et al. | 250/389 |
| 2008/0001884 | A1* | 1/2008 | Eames | 345/92 |
| 2008/0042070 | A1* | 2/2008 | Levin | 250/370.13 |
| 2008/0061224 | A1* | 3/2008 | Montemont | 250/252.1 |

OTHER PUBLICATIONS

C. M. H. Chen, S. E. Boggs, A.E. Bolotnikov, W. R. Cook, F. A. Harrison, and S. M. Schindler, "Numerical modeling of charge sharing in CdZn Te pixel detectors," IEEE, Trans. Nucl. Sci. 49. pp. 270-276, Feb. 2002.

B. Fultz and J. Y. Y. Lin, "Mossbauer diffractometry." in Material Research in Atomic Scale by Mossbauer Spectroscopy, M. Mashlan, M. Miglierini, and P. Schaaf. eds.. NATO Science Series: II: Mathematics, Physics and Chemistry 94, pp. 285-295, 2003.

(Continued)

Primary Examiner—David P Porta
Assistant Examiner—Marcus H Taningco
(74) Attorney, Agent, or Firm—Steinfl & Bruno (57) ABSTRACT Interaction depth of photons in a CdZnTe pixel detector is measured by configuring an ASIC connected to the detector to measure both positive polarity and negative polarity signal amplitudes and then measuring a core pixel having positive signal amplitude and hallow pixels having negative signal amplitude and surrounding the core pixel.

8 Claims, 5 Drawing Sheets

OTHER PUBLICATIONS

F. A. Harrison, S. . Boggs, A. E. Bolotnikov, F. E. Christensen, W. R. Cook, W. W. Craig. C. J. Halley, M. A. Jimenez-Garate. P. H. Mao, S. M. Schindler, and D. L. Windt.. "Development of the High-Energy Focusing Telescope (HEFT) balloon experiment." in X-Ray Optics, Instruments, and Missions III, J. E. Truemper and B. Aschenbach, eds., Proc. SPIE 4012, pp. 693-699, Jul. 2000.

A. E. Bolotnikov, S. E. Boggs, C. M. H. Chen, W. R. Cook, F. A. Harrison, and S. M. Schindler. "Investigation of optimal contact geometry for CdZn Te pixel detectors." in Hard X-Ray. Gamma-Ray. and Neutron Detector Physics II, R. B. Janus and R. C. Schirato, eds., Proc. SPIE, 4141. pp. 243-252, Nov. 2000.

J. E. Clayton. "Very high pin count flip chip assembly using conductive polymer adhesives," in IMAPS 2003 - 35th Annual Symposium on Microelectronics, in print.

J. Y. Y. Lin and B. Fultz, "Site-specific long-range order in 57 Fe3Al measured by Mossbauer diffractometry," Phil. Mag. 83. pp. 2621-2640, 2003.

PCT International Search Report for PCT/.US2008/055042 filed on Feb. 26, 2008 in the name of California Institute of Technology et al.

PCT Written Opinion for PCT/US2008/055042 filed on Feb. 26, 2008 in the name of California Institute of Technology et al.

* cited by examiner

DEPTH SENSING IN CDZNTE PIXEL DETECTORS

CROSS REFERENCE TO RELATED APPLICATIONS

The present application claims the benefit of priority of U.S. Provisional Patent Application Ser. No. 60/903,807 filed on Feb. 27, 2007 for "Depth Sensing in CdZnTe Detectors" by Fiona A. Harrison and Walter Cook, the contents of which are incorporated herein by reference in their entirety.

FIELD

The present disclosure relates to CdZnTe detectors. In particular, it relates to a method of measuring interaction depth of signals in CdZnTe pixel detectors.

BACKGROUND

CdZnTe (cadmium-zinc-telluride or CZT) detectors are known in the art. U.S. published patent application US2005/0167606 discloses CZT pixel detectors connected to an ASIC chip having readout circuits arrayed in a pattern matching the pixel pattern of the CdZnTe detector. Here the term pixel refers to the elements into which the readout contact is divided (see FIG. 2). These pixels are typically square and much smaller than the area of the detector. The ASIC chip receives signals from the CdZnTe detector pixels, and is connected to a microprocessor which processes the signals output by the CdZnTe detector and passed through the ASIC chip. US2005/0167606 is incorporated herein by reference in its entirety.

SUMMARY

The present disclosure relates to a method and apparatus for measuring interaction depth—in addition to event energy and lateral position—for each event detected in the pixeled CdZnTe (cadmium zinc telluride, or CZT) detectors. As defined through the present application, an event is a collection of nearly simultaneous interactions in the detector stimulated by a single incident X-ray photon.

According to an aspect of the present disclosure, a method for measuring interaction depth of photons in CdZnTe pixel detectors is disclosed, comprising: providing a CdZnTe pixel detector; connecting a side of the CdZnTe pixel detector to an application specific integrated circuit (ASIC); configuring the ASIC for measuring both positive polarity and negative polarity signal amplitudes; applying a bias on the CdZnTe pixel detector such that a segmented contact of the CdZnTe pixel detector collects electrons; upon interactions of photons in the CdZnTe pixel detector, measuring, through the ASIC, a core pixel having positive signal amplitude and hallow pixels having negative signal amplitude and surrounding the core pixel; and calculating a ratio of a sum of the positive signal amplitudes of the hallow pixels to the negative signal amplitude of the core pixel, thus measuring the interaction depth of the photons.

Further aspects and embodiments of the present disclosure are shown in the present description and attached drawings and claims.

The depth of interaction information allows 1) better spectral response via correction for low energy tailing, 2) improved image resolution in Compton and coded aperture applications and 3) differentiation of source events incident on the front of the detector from background events incident on the rear.

DETAILED DESCRIPTION

Figures 1, 2:
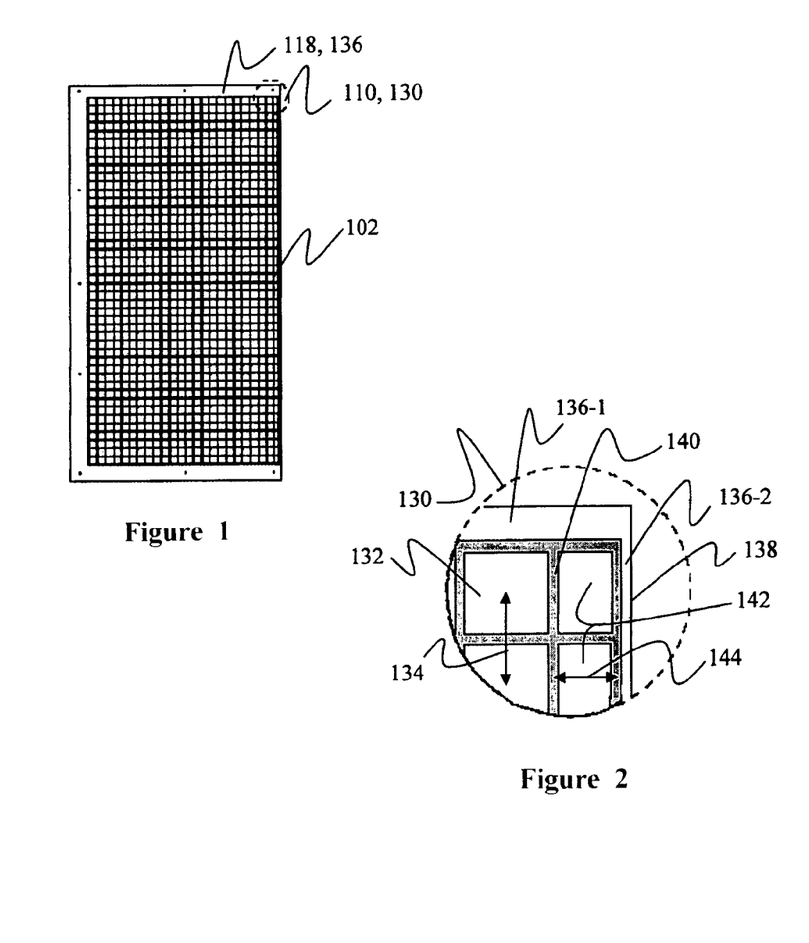
FIG. 1 shows a prior art sketch of a patterned CdZnTe crystal.
FIG. 2 shows an enlarged view of a section of the patterned CdZnTe crystal.

As already shown in US2005/0167606, FIG. 1 depicts a sketch of a patterned CdZnTe crystal 102. CdZnTe crystals with segmented metal electrodes are available, for example, from eV Products, 373 Saxonburg Blvd., Saxonburg, Pa. 16056. In one, non-limiting, embodiment the CdZnTe crystal 102 is 23.6 millimeters (mm) by 12.9 mm by 2 mm thick. One skilled in the art will appreciate that the CdZnTe crystal may be larger or smaller depending upon the design specifications. In one embodiment, the size of the crystal is limited by the availability of CdZnTe crystals, which comprise a single crystal of highly uniform material.

As also shown in US2005/0167606, FIG. 2 is an enlarged view of a section of the patterned CdZnTe crystal (102). This embodiment is referred to as a non-gridded pattern detector (110). In particular, FIG. 2 depicts the patterned CdZnTe crystal (102) in which the anode plane does not have a grid between pixel contacts (132). In one embodiment of this non-gridded pattern detector (130), the cathode, which is the opposite side of the CdZnTe crystal (102) from the segmented anode (the cathode is not shown in FIG. 2), has a monolithic platinum contact, while the anode plane (102) is patterned into a 24×44 pixel array of 498 micrometer pitch (134), surrounded by a first portion (136-1) of a guard ring (136) that is 1 mm, and a second portion (136-2) of the guard ring (136) which is 0.1 mm. One skilled in the art will appreciate that in one embodiment the guard ring (136) has four sides, three sides comprising the first portion (136-1) of the guard ring (136) and a fourth side comprising the second portion (136-2) of the guard ring (136), whereby the guard ring (136) surrounds all of the outer pixel contacts belonging to a given crystal (102). This guard ring (136) configuration allows two detectors to be placed side by side to form a roughly square sensor area with minimal dead area in between. The second portion (136-2) of the guard ring (136) is the mating edge (138). There is a 30 micrometer gap (140) between pixel contacts (132). The mating edge pixels (142) have a 300 micrometer pitch (144) along the mating edge (138).

Figure 3:
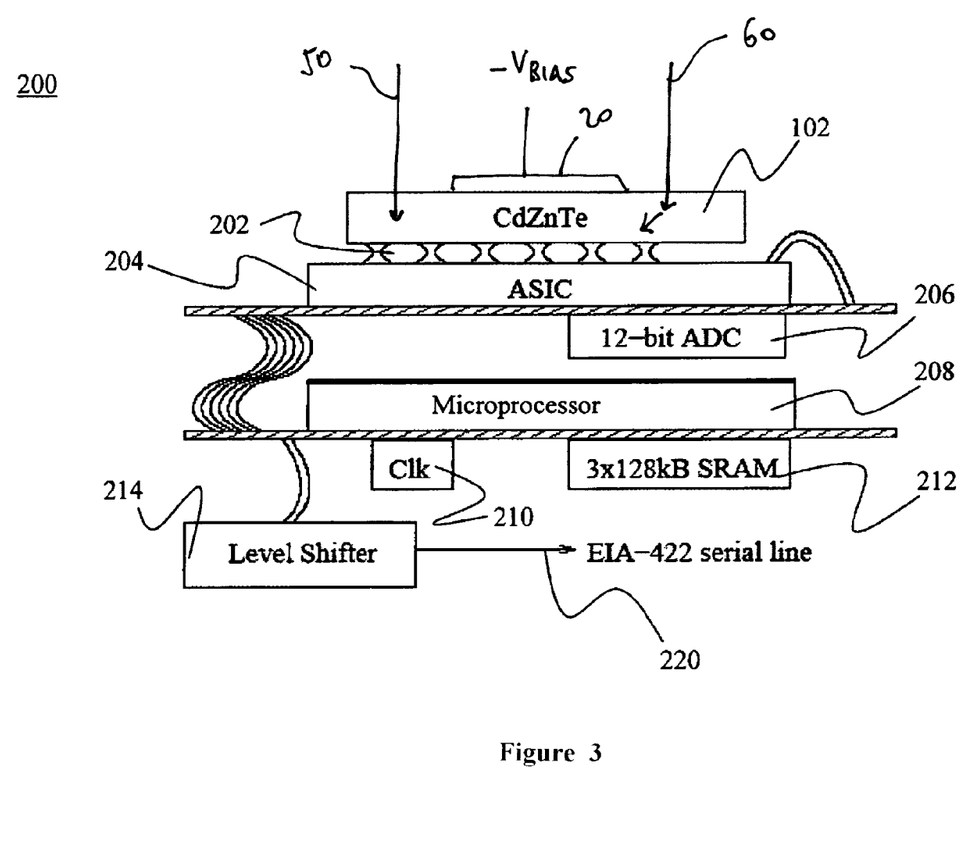
FIG. 3 shows a block diagram of a detector system in accordance with the present disclosure.

Portions of FIG. 3 have already been described in detail in US2005/0167606, incorporated herein by reference in its entirety. In particular, FIG. 3 shows a CdZnTe pixel detector (102). The pixel detector (102) comprises a solid contact (20) on one side and an array of pixel contacts (202) on the opposite side.

A readout ASIC (204) is bonded directly to the pixeled side (202) of the detector (102) using one of several techniques known to the person skilled in the art. The readout ASIC provides a separate readout circuit for each pixel. In accordance with the present disclosure, the readout ASIC is capable of simultaneously measuring and recording both positive and negative polarity signal amplitudes.

A bias voltage (e.g., −Vbias) is applied on the solid contact side (20) of the detector (102). The bias of the solid contact is negative with respect to the anode contact, so that electrons created within the detector by a photon interaction are directed towards the anode pixels. A typical detector thickness is about 2 to 5 mm and a typical pixel pitch is about 0.5 mm (which should match between ASIC 204 and detector 102). A typical bias voltage can be between about −200 to about −600 V.

During operation of the detector (102)+ASIC (204) assembly, an X-ray photon (50) interacts in the detector (102) via the photoelectric effect, depositing its energy in a small region (<few microns) of the detector (102). At the interaction site, a number of electron/hole pairs are created proportional to the interaction energy at a rate of about 200 electron/hole pairs per keV. Under the influence of the electric field induced by the applied detector bias—Vbias, the electrons travel towards the pixel contacts (202), while the holes travel toward the solid contact (20).

However, in CdZnTe materials there is typically a large difference in the (mobility*lifetime) product for the holes and electrons, such that the electrons readily move entirely across the detector (10), while the holes tend to become trapped close to the original interaction site. Thus the electrons are directly collected by the pixel readout circuitry (204), while the holes affect the readout signal only via the image charge that they induce on the readout pixels. The amount and distribution of the image charge is a function of the depth of interaction and is of opposite polarity to the directly collected electron signal.

Figure 5:
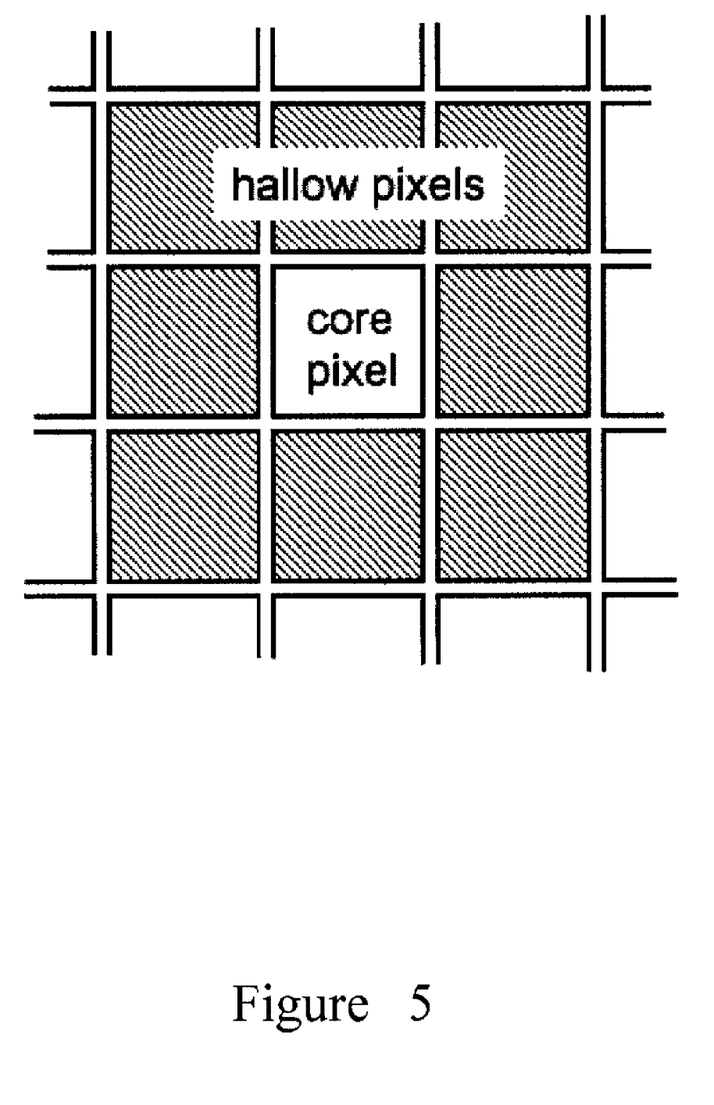
FIG. 5 shows the physical relationship between the central core pixel and the surrounded hallow pixels.

While the directly collected electron signal is localized to one pixel or occasionally two adjacent pixels, the image charge signal can be spread out many pixels. Thus, for a typical event, there is a core pixel (or pixels) with a negative signal surrounded by a halo or "hallow" of pixels with relatively smaller positive signals. See, for example, FIG. 5. The depth of interaction can be inferred from the ratio of the sum of the positive signals in the hallow to the large negative signal in the core.

As mentioned above, the ASIC (204) according to the present disclosure will simultaneously provide low-noise measurements of amplitude for both the negative polarity "core pixel" signals and positive polarity "hallow pixel" signals.

The capability of the ASIC (204) to simultaneously measure the amplitude of both positive and negative polarity signals allows depth sensing ability, since the core (electron) signal is one (negative) polarity, while the halo (hole) signal is of the opposite (positive) polarity. The ASIC (204) triggers on any pixel with a sufficiently large negative signal, but once triggered can provide measurements of all pixels having positive or negative signal amplitudes.

In other words, the discriminator in each pixel has a threshold. If the threshold is exceeded (by a negative signal of sufficiently large amplitude) then the discriminator "fires" and the event is detected. In the HEFT ASIC the low noise level allows setting the pixel threshold quite low, in the range 2 to 6 keV. This assures a high efficiency for detection of "events" with total energy greater than 4-12 keV since in the worst case the event energy splits evenly between two adjacent pixels (for the core component). In other ASICs with higher noise the threshold might need to be set higher, but this is still satisfactory, for example, for the efficient detection of higher energy photons and the depth sensing thereof.

The ability of the ASIC (204) to measure all pixels having positive or negative signal amplitudes depends on the sampling architecture used for the ASIC (204), which allows a measurement that is different from a "peak detector" amplitude measurement scheme, which would be inherently limited to a single polarity (positive or negative).

In particular, the ASIC (204) contains sampling circuitry that can track both positive and negative signals. For example, two capacitors could be used, one providing a "before event" preamp output sample and the other providing an "after event" output sample, with the signal amplitude taken as the difference. Other embodiments providing a higher number of sample capacitors (e.g. 16 sample capacitors) can be devised, in order to reduce the electronic noise level, so long as the sampling process can track both positive and negative signals.

In practice, according to one embodiment of the present disclosure, the capability to measure both positive and negative signal amplitudes is obtained by biasing the preamp output such that zero input corresponds to some finite preamp output current, while a negative signal input causes the preamp output current to increase and a positive signal input causes the preamp output current to decrease (that is the preamp is inverting). The preamp output current is continuously integrated onto the sample caps in rotary fashion with the sampling halted shortly after an event trigger is detected. If the post trigger samples are below the pre-event ones (for a particular pixel) then (for that pixel) the net input signal amplitude is positive. Conversely, if the post event samples are above the pre-event ones, then the net input signal amplitude is negative.

Figure 4:
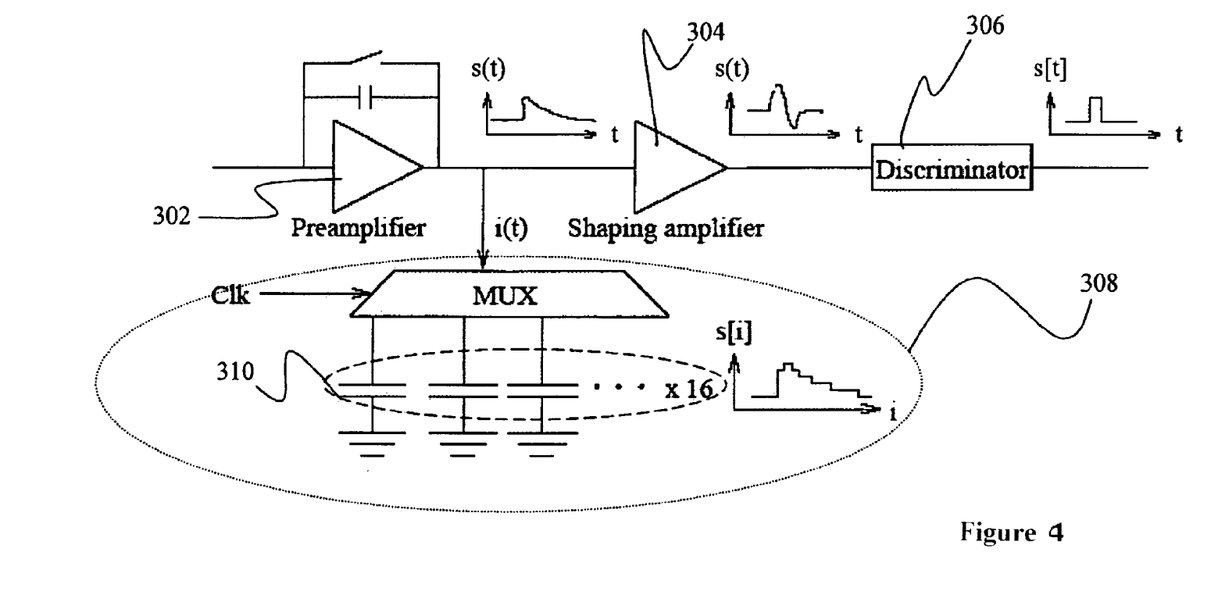
FIG. 4 shows a block diagram of circuitry used to implement one ASIC (application-specific integrated circuit) pixel in accordance with the present disclosure.

FIG. 4 shows an exemplary embodiment of such a circuit, where a bank of sixteen switched capacitors (310) is shown. As shown in FIG. 4, the pre-amplifier's (302) output is converted to a current and is integrated by the capacitors, cyclically one by one, with a one microsecond integration time. This process gives a record of the current level during the previous 15-16 microseconds at any given time. When a trigger is detected, sampling continues for eight more samples, after which the circuit freezes while the samples are read out on the serial readout line (220), shown in FIG. 3.

In addition to reading out the 16 samples from each triggered pixel, samples can also be read out from a collection of other pixels for additional information to assist with the pulse height recovery process. These other pixels include all the ones neighboring any triggered pixel, i.e. those sharing an edge or a corner with a triggering pixel, and a 3×3 array of reference pixels remote from the triggered pixels. Samples at the neighboring pixels contain any systematic noise that is common in the vicinity of the triggering pixel, while samples at the reference pixels contain noise that is common to the entire chip. The neighboring pixels may also have collected a small fraction of the charge induced from the X-ray event, if the event has occurred near the edge of the triggering pixel, and this charge may be too small to have triggered the neighboring pixel. With these additional samples, a second discriminator is implemented with a much lower threshold, and systematic noise is also removed from the triggered pixels. In one embodiment the second discriminator is implemented in software.

An event triggering a single pixel involves reading out 16 samples from 3×3+3×3=18 pixels, which is 18×16=288 12-bit numbers. An event where two adjacent pixels trigger, which is termed a charge-sharing event, requires reading out 16 samples from 4×3+3×3=21 pixels, which is 21×16=336 12-bit numbers. With additional information, such as pixel coordinates, time information, etc., each event produces about 0.5 kilobytes of information. The read-out process takes about 30 milliseconds. In one embodiment, having one ADC for two hybrid sensors, the focal plane can tolerate count rates of up to 100 counts per second before saturating.

Therefore, in accordance with the present disclosure, photon interaction depth sensing capability is obtained by a) triggering on the negative "core" signal from any pixel and b)

providing, once triggered, signal amplitude measurements not only from the negative core pixel, but also from the surrounding positive polarity "hallow" pixels as well.

According to one embodiment, the ASIC (204) is a "HEFT" ASIC, where HEFT stands for the balloon-borne High Energy Focusing Telescope, also mentioned in US2005/0167606.

At higher energies, gamma-rays may interact via one or more Compton scatterings prior to a final photoelectric absorption. Those Compton scatterings are briefly represented by reference numeral (60) in FIG. 3. When the distances between the various interaction locations are adequately small, the detector is unable to spatially resolve the separate interaction locations and the hallow/core signal ratio still provides a metric for the average interaction depth.

However, if the interaction locations are adequately separated (by at least several pixels), then the interaction locations can be separately resolved and separate lateral position and depth measures obtained for each. In other words, at energies above about 200 keV, an incident gamma ray (60) may Compton scatter one or more times prior to final photoelectric absorption. If the various interaction sites (one for each scattering and one for the final absorption) are sufficiently well separated, then a separate depth estimate may be obtained for each site. "Adequately" separated or "sufficiently well" separated will mean separated enough that the "core" pixel for each site is unambiguously identifiable. Typically, this means that the core pixels should be separated by at least one non-core or "hallow" pixel, meaning that that the interaction sites should be at least 2 pixels distant from each other.

Figure 6:
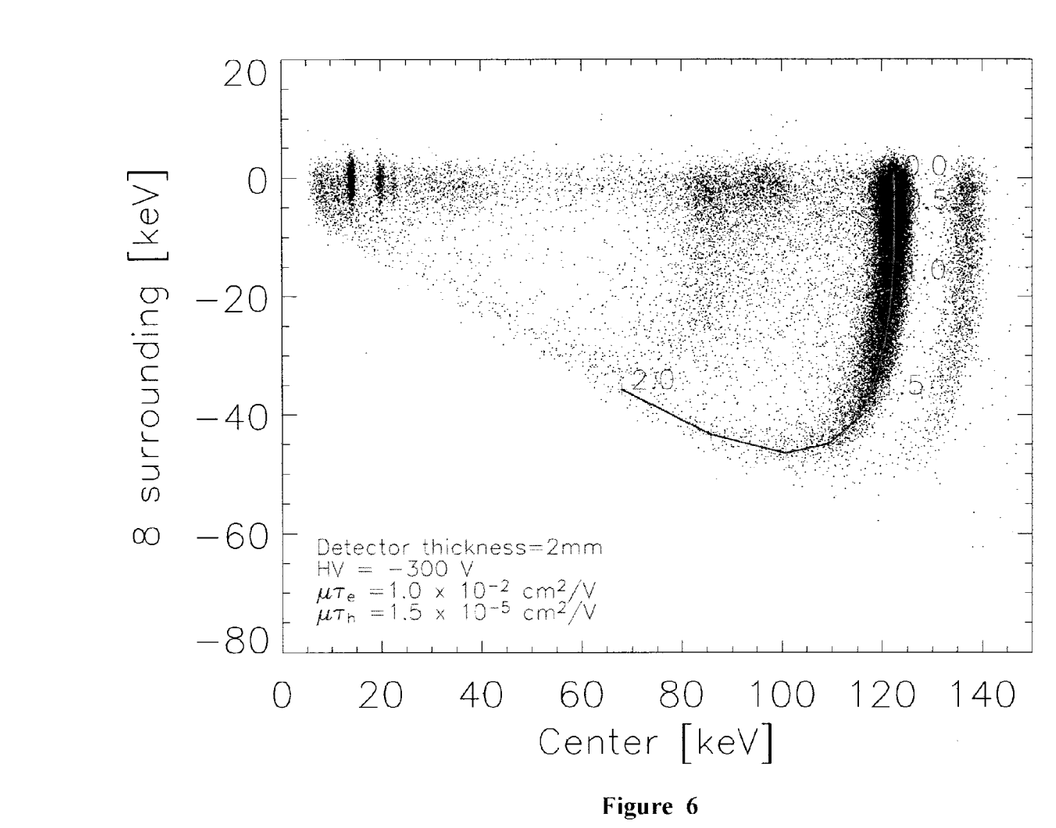
FIG. 6 shows "hallow signal" (plotted vertically) versus "core signal" (plotted horizontally) for events due to a Co57 source illuminating the solid contact side of a CdZnTe pixel detector.

The ability of a pixeled CdZnTe detector to yield depth of interaction information is illustrated in FIG. 6, showing response to hard X-rays from a Co57 source. Here, measurements from each hard X-ray event are plotted as a single dot, with the horizontal coordinate proportional to the core signal, the vertical coordinate proportional to the sum of signals from the hallow. In this case, the plot has been restricted to include only events in which the core signal is restricted to a single pixel, and the hallow signal has been taken as the sum of the signals from the eight surrounding pixels. Polarities have been reversed, such that the core signal is shown as positive and the hallow signal negative.

The Co57 (Cobalt 57) source was exposed to the solid contact side of the detector such that the low energy line photons at 14, 20 and 23 keV, which penetrate only slightly, interact near the solid contact. These x-ray energies result from K x-rays of Rhodium, the substrate material used in the Co57 source that produced the data shown in FIG. 6. For interaction locations near the solid contact, the holes' image charge is mainly contained in the solid contact and the hallow signal is near zero. However, the photons at line energies of 122 and 137 keV penetrate throughout the detector volume and provide a wide range of hallow signals as shown. As the interaction depth moves away from the solid contact, the amplitude of the hallow signal increases. At small distances from the solid contact the signal amplitude in the core pixel is little changed, but as the distance increases the core pixel signal amplitude decreases due to the increasing deficit induced by the holes' image charge. As the depth of interaction approaches the pixel contact plane, the amplitude in both core and hallow pixels decreases as the holes' image charge becomes even more confined to the core pixel. A detailed model of the charge transport and signal generation processes in CdZnTe detectors shows that the shape of the track formed the 122 keV events in FIG. 6 is well fitted given reasonable assumptions for the hole and electron (mobility*lifetime) products.

In summary, according to one of the aspects of the present disclosure, interaction depth of photons in a CdZnTe pixel detector is measured by configuring an ASIC connected to the detector to measure both positive polarity and negative polarity signal amplitudes and then measuring a core pixel having positive signal amplitude and hallow pixels having negative signal amplitude and surrounding the core pixel.

Accordingly, what has been shown is a method for measuring interaction depth of photons in CdZnTe detectors. While the methodology has been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

What is claimed is:

1. A method for measuring interaction depth of photons in CdZnTe pixel detectors comprising:
   providing a CdZnTe pixel detector;
   connecting a side of the CdZnTe pixel detector to an application specific integrated circuit (ASIC);
   configuring the ASIC for measuring both positive polarity and negative polarity signal amplitudes;
   applying a bias on the CdZnTe pixel detector such that a segmented contact of the CdZnTe pixel detector collects electrons;
   upon interactions of photons in the CdZnTe pixel detector, measuring, through the ASIC, a core pixel having positive signal amplitude and hallow pixels having negative signal amplitude and surrounding the core pixel; and
   calculating a ratio of a sum of the positive signal amplitudes of the hallow pixels to the negative signal amplitude of the core pixel, thus measuring the interaction depth of the photons.

2. The method of claim 1, wherein connecting a side of the CdZnTe pixel detector to an ASIC comprises providing a plurality of pixel contacts connecting the CdZnTe pixel detector with the ASIC.

3. The method of claim 1, further comprising providing a solid contact on a side of the CdZnTe pixel detector opposite the side of the CdZnTe pixel detector connected to the ASIC, the bias being applied on the solid contact.

4. The method of claim 1, wherein configuring the ASIC for measuring both positive polarity and negative polarity signal amplitudes comprises providing the ASIC with capacitive sampling circuitry.

5. The method of claim 4, wherein one or more capacitors of the capacitive sampling circuitry provide a "before event" output sample and one or more capacitors of the capacitive sampling circuitry provide an "after event" output sample, the signal amplitude being taken as a difference between the "before event" and "after event" output samples.

6. The method of claim 1, wherein separate interactions of photons in the CdZnTe pixel detector are at least two pixels distant from each other.

7. The method of claim 1, wherein a cathode bias applied to the CdZnTe pixel detector is negative relative to an anode of the CdZnTe pixel detector.

8. The method of claim 7, wherein relative bias between the cathode and the anode of the CdZnTe pixel detector is between −600 V and −200V.

* * * * *

UNITED STATES PATENT AND TRADEMARK OFFICE
CERTIFICATE OF CORRECTION

| | | |
|---|---|---|
| PATENT NO. | : 7,518,118 B2 | Page 1 of 1 |
| APPLICATION NO. | : 12/037889 | |
| DATED | : April 14, 2009 | |
| INVENTOR(S) | : Fiona A. Harrison and Walter Cook | |

It is certified that error appears in the above-identified patent and that said Letters Patent is hereby corrected as shown below:

In the specification, Col. 1 line 18 the following Federal Support Statement should be added after the paragraph "Cross Reference to Related applications" and before the paragraph "Field".

"Statement of Government Grant

This invention was made with government support under NNG06WC20G & NAG5-5398 awarded by NASA. The government has certain rights in the invention."

Signed and Sealed this

Twenty-second Day of September, 2009

David J. Kappos
*Director of the United States Patent and Trademark Office*